May 4, 1937.  W. J. SCHIRMER  2,079,468
LUMINOUS DEVICE AND METHOD OF AND APPARATUS FOR MAKING THE SAME
Original Filed May 15, 1936   2 Sheets-Sheet 1
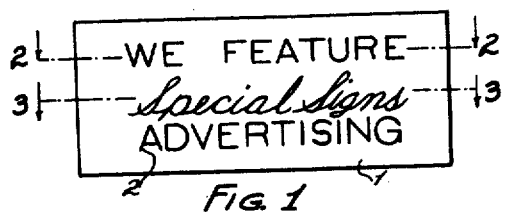
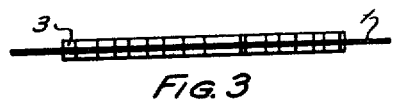
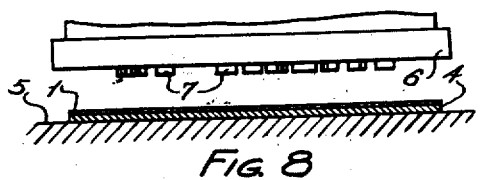
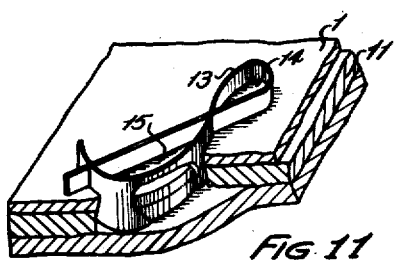
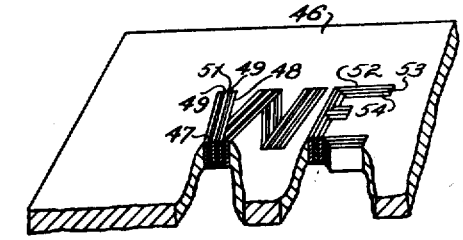
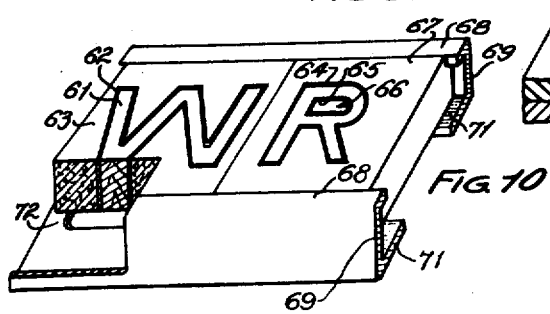
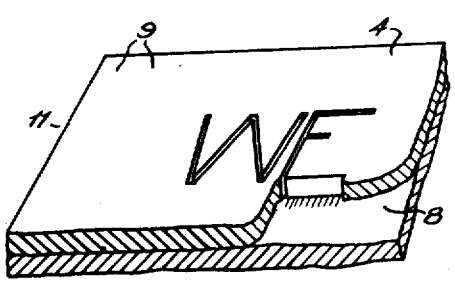
INVENTOR.
WILLIAM J. SCHIRMER,
BY
ATTORNEYS.

May 4, 1937. W. J. SCHIRMER 2,079,468
LUMINOUS DEVICE AND METHOD OF AND APPARATUS FOR MAKING THE SAME
Original Filed May 15, 1936 2 Sheets-Sheet 2
Fig. 14
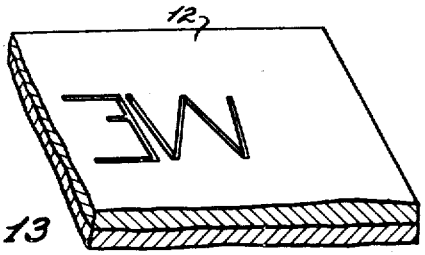
Fig. 13
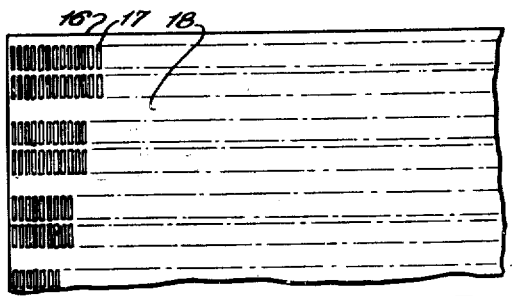
Fig. 15
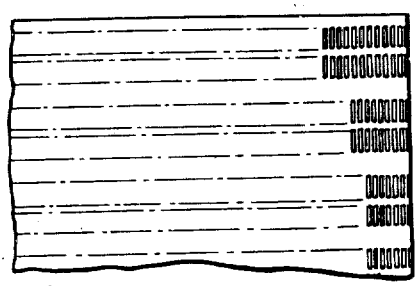
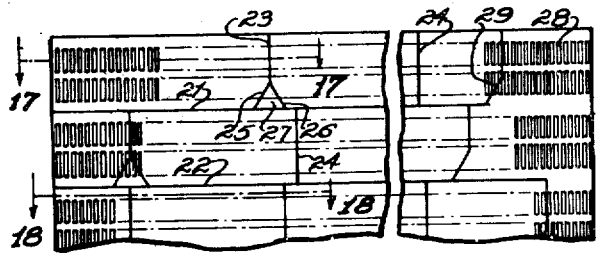
Fig. 16
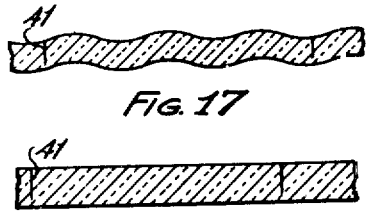
Fig. 17
Fig. 18
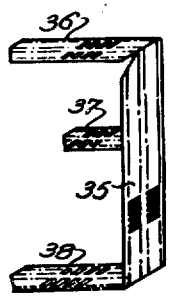
Fig. 19
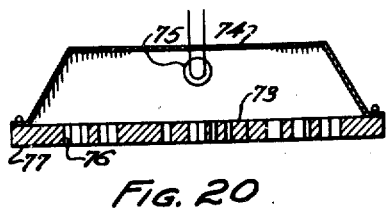
Fig. 20
INVENTOR.
WILLIAM J. SCHIRMER,
BY
ATTORNEYS.

Patented May 4, 1937

2,079,468

UNITED STATES PATENT OFFICE 2,079,468

LUMINOUS DEVICE AND METHOD OF AND APPARATUS FOR MAKING THE SAME

William J. Schirmer, Cleveland, Ohio

Original application May 15, 1936, Serial No. 79,888. Divided and this application February 15, 1937, Serial No. 125,794

12 Claims. (Cl. 40—133)

This invention, as indicated, relates to a luminous device and method of and apparatus for making the same. This application is a division of my application Serial No. 79,888, filed May 15, 1936. More particularly, it comprises transparent or translucent members set edgewise and arranged to transmit light along the lines of certain designs or characters. Such light-transmitting elements are preferably held in an opaque base, but other means of supporting the same may be utilized so long as a sufficient contrast in appearance between the base or body member of the device and the light-transmitting elements is brought about.

The invention also includes the method of producing devices of the character set forth, whereby characters in continuous script form may be presented in a luminous outline substantially unbroken from end to end and without any intervening dark spots.

In luminous signs, as heretofore constructed, a stencil type of outline has been employed, and where luminous strips of glass or flexible transparent or translucent material has been utilized, such material has been provided with notches or shoulders. Thus, while the outer portion of the sign has been substantially continuous, the perforations through the supporting member of the sign have been interrupted, and at each interruption, when light is transmitted from the rear of the supporting member, a shadow appears across the projecting portions forming the characters or designs at the front of the sign. These shadows and interruptions detract greatly from the effectiveness of the sign, which has the appearance of having been injured at such points.

The present invention comprises a method of making such devices so that script or other matter may be presented in continuous form throughout with no shadows or interruptions, and also provides for a secure and stable support for the characters or design. The method is one which may be readily carried out by persons of limited skill, owing to the auxiliary equipment utilized to position the luminous members in the supporting member and to insure the exact length of such luminous elements to fit the openings provided for them. The invention also includes the provision of preformed characters and associated background, which may be assembled in suitable frames to form a sign or design of various characters.

The principal object of the present invention is to provide a device wherein transparent or translucent members are set edgewise with reference to a supporting member, and to present at the forward edges the outlines of a design or characters with high luminosity free of interruptions or darkened areas over portions of the design or character outlines.

Another object of the invention is to provide a luminous device wherein the light-transmitting elements are composed of a series of substantially parallel thin members set edgewise.

Another object of the invention is to provide a luminous device with light-transmitting elements formed of a plurality of thin transparent members with intermediate opaque members or transparent members of contrasting color.

Another object of the invention is to provide individual characters or unit designs supported in an opaque member and adapted to be assembled in a supporting member to provide a continuous sign or design.

Another object of the invention is to provide for the quantity manufacture of a luminous device having designs or characters of standardized predetermined size, whereby luminous elements of precut length may be inserted in preformed openings progressively so as to provide a luminous device having continuous outlines throughout which may be assembled at a high rate of production at a minimum of cost and with uniformity of appearance and service.

Another object of the invention is to provide a recessed template for the assembly of luminous devices wherein the supporting member will be uniformly positioned with relation to the luminous elements.

A further object of the invention is to provide a method of scoring flexible light-transmitting sheets to provide successive sections of proper width and length to form predetermined designs and characters when used progressively in a precut supporting member.

Another object of the invention is to provide a companion template in reverse for the template mentioned in the previous paragraph, whereby the supporting member of an assembled luminous device may be accurately centered with reference to the luminous members.

A further object of the invention is to provide precut lengths of sections of flexible luminous elements with a straight end portion at one edge and a beveled corner at the opposite edge to permit easy insertion of such strip in a precut opening in the supporting member.

Various other objects and advantages will be apparent to those skilled in the art to which my invention relates from the following description in connection with the accompanying drawings showing several embodiments which my invention may assume and wherein Figure 1 is a plan view showing a sign embodying the principles of the invention;

Figure 2 is a longitudinal sectional view, taken along the line 2—2, shown in Figure 1, looking in the direction of the arrows;

Figure 3 is a view similar to Figure 2, taken along the line 3—3 shown in Figure 1, looking in the direction of the arrows;

Figure 4 is an edge view, as seen from above, of a modified form of device embodying the principles of the invention, with the luminous elements mounted on the rearward face of a transparent supporting member;

Figure 5 is a view similar to Figure 4 with the luminous elements mounted on the forward face of a transparent supporting member;

Figure 6 is a view similar to Figure 2, showing luminous supporting elements projecting only at the back of the supporting member;

Figure 7 is a view similar to Figure 6 with the luminous elements projecting only at the front of the supporting member;

Figure 8 is a diagrammatic view showing the die cutting means used to form openings in the supporting base member and template;

Figure 9 is a perspective view, cut away in part, to illustrate the structure of a device having a plurality of parallel thin luminous and spacing elements set edgewise;

Figure 10 is a perspective view, cut away in part to show opaque characters with luminous outlines inserted in an opaque base as independent units associated in a supporting frame;

Figure 11 is a perspective view, broken away in part, showing the assembly of a script letter formed of luminous strips through the use of a recessed template;

Figure 12 is a perspective view, broken away in part, showing the top and bottom portions of a recessed template;

Figure 13 is a perspective view showing a companion template recessed in reverse order to the primary template;

Figure 14 is a central longitudinal sectional view, showing a luminous device interposed between primary and reverse templates for centering the supporting member;

Figure 15 is a fragmentary plan view showing a flexible sheet of light-transmitting material preliminary to scoring and subdividing the same into sections;

Figure 16 is a fragmentary plan view showing a flexible sheet of light-transmitting material when scored to provide sections of suitable width and length and corner construction for assembly into luminous devices;

Figure 17 is a greatly enlarged longitudinal sectional view showing a rib portion of the flexible transparent material as seen along the line 17—17, shown in Figure 16, looking in the direction of the arrows;

Figure 18 is a view similar to Figure 17, taken along the line 18—18, shown in Figure 16, looking in the direction of the arrows;

Figure 19 is a perspective view showing the sections of light-transmitting material in assembled relation to form characters; and Figure 20 is a central longitudinal sectional view showing a sign having a luminous unit at the front thereof embodying the principles of the invention.

In the form of construction shown in Figures 1, 2, and 3, a base member 1 is provided, preferably formed of heavy cardboard provided with a plurality of openings 2 therein in the form of characters to receive luminous sections inserted edgewise therethrough. The luminous elements, as will be noted in Figure 2, are in the form of thin flexible transparent strips 3 cut to appropriate lengths and inserted edgewise in the respective openings in the base member between the dead ends of said openings, and associated with companion members in adjacent openings so as to form predetermined characters. Where the openings are continuous, as in the case of matter presented in script form, such as is shown in the second line, the luminous units, as seen from above, will appear continuous as shown in Figure 3. In each of Figures 2 and 3, the transparent flexible sections are inserted through the cardboard base member so as to project approximately equally toward the front and rear thereof. A transparent marginal binder may be used to lock the members in the base.

The assembly of a sign is brought about through the use of a method of manufacture and assembly embodying the following steps. The cardboard base 1 is positioned above a relatively thin board 4, preferably of soft wood, upon a cutting table 5, and a die member 6 provided with a series of cutting blades 7 of appropriate shape and sharpness is forced against the cardboard and wood supported on the table. The cardboard is perforated along the lines of the die cutter, and the wood is imprinted with the outlines of the characters or designs so cut. A jigsaw or routing tool is then utilized to enlarge the openings formed in the board 4 and to extend such openings completely through the board, as is shown in Figure 12. The board is then laid upon a similar board 8 and secured thereto by means of nails or other fastening means at the corners thereof, and a recessed template 11 is thus provided. A companion recessed template 12 is provided in a similar manner in reverse, as is shown in Figure 13. The templates thereafter are used repeatedly on additional sheets of cardboard base to cut the same and to assemble the signs as stated.

When a sign of the character shown in Figures 1 to 3 is to be formed, the openings in the cardboard base member 1 are placed in registry with the openings in the primary template 11 and the strips of thin transparent flexible material 13 are then engaged through the alined openings, as is clearly shown in Figure 11. The recess in the template is of appropriate depth to center the strips of luminous material with reference to the base which will be positioned at an intermediate point, and portions of cardboard which have become detached from the main body of the cardboard and which thus form independent units 14, 15, which may be designated "islands", are properly supported against displacement while the luminous strips are being inserted in position.

The support of such independent units prevents their being moved downwardly, but in the course of manipulation they may tend to rise above the plane of the main section of the cardboard. To avoid having such detached units or "islands" out of alinement with the main body of the cardboard, the companion template formed in reverse is then positioned above the assembled luminous device in the manner shown in Figure 14, and moderate pressure upon the assembled structure will force all of the parts into absolute uniformity throughout the plane of the base member 1.

In order to provide for quick assemblage of the luminous devices, the sheet of luminous material, which ordinarily is received in the form shown in Figure 15, with a series of ribbed areas ordinarily spaced in rows 16, 17 with a relatively wide plain area 18 intermediate each pair of rows longitudinally, is subdivided by scoring in the manner shown in Figure 16. The scoring is accomplished by means of a die similar to the die 6 shown in Figure 8, but composed wholly of straight blades set to provide a series of longitudinal cuts 21, 22 of uniform width and to provide transverse cuts 23, 24, of predetermined length progressively according to the length of section required to be inserted between the dead ends of the openings provided in the cardboard base to form the character outlines. Transverse cut 23, as shown, is formed with a straight section extending over the greater portion of the width of the strip and with a pair of angular cuts 25, 26, merging therewith to provide a triangular cut-out section 27 to be discarded leaving on the main strips an angular lower edge portion providing for the free insertion of the sections through the cardboard. It will be noted that each section has a straight edge at one end and an angular corner at the opposite end, as is more clearly shown in Figure 19, and this permits the insertion of the straight end of the strip in the opening in the cardboard preliminary to threading the length thereof through said opening. The cut-away corner permits the opposite end of the strip then to be engaged without difficulty, and such cut-away corner appears at the rear of the luminous device and does not interfere with the light-transmitting function of the same or introduce any interruptions or dark spots in the continuous outline of the design or characters at the front of the same. Adjacent the further end of the sheet of flexible transparent material, the extreme end portion 28 is wasted material, and the angular cut at such point may comprise a single angular cut or scoring 29 in place of two such cuts.

Where a character such as the letters "W" and "E" is to be formed, as shown in Figure 19, four equal lengths of strips 31, 32, 33, 34, are laid out along the upper row of the flexible material, and these are picked up progressively and inserted through the corresponding openings in the cardboard base. The next length of strip will comprise the upright member 35 of the letter "E", which will be followed by a length adequate to form the top member 36 of the letter "E", followed by a short member 37 adapted to form the intermediate member of the "E", which in turn is followed by a longer strip 38 adapted to form the base of the letter "E". The same principle applies to all the cuts made on the strip, and the scoring, as more clearly shown in Figures 17 and 18, is made by forming a cut 41 which extends approximately three fourths of the distance through the material and enables it to be readily separated from the remainder of the material as it is picked up by the operator assembling the signs. Thus, there is no necessity of using a notching device and a cutting tool in forming each individual letter, and the pre-cut arrangement provides for absolute accuracy in determining the length of the sections which it is otherwise impossible to provide for, owing to the human error in judging the extent of the space to be filled when endeavoring to approximate the length of strips as the work progresses. There is also a loss of time in the cutting and notching operations which is entirely eliminated through the use of the method herein outlined.

The signs, as shown in Figures 2 and 3, have the luminous units projecting to an equal extent on each side of the same. In the form shown in Figure 6, the luminous units 3 project only at the rear of the sign, and in the form shown in Figure 7, they project only at the front of the sign. Where the sign is of the type shown in Figure 6, the letters will appear as sharp line letters with no third dimensional effect, and where they are arranged as in Figure 7, there will be some economy of material effected through use of luminous material of less width than would ordinarily be required for signs of the character shown in Figure 3.

In the form of construction shown in Figures 4 and 5, in place of the luminous units being supported upon a slitted cardboard base, such units 41 are secured by adhesive or other suitable means to the rearward face of a sheet of glass 42, as shown in Figure 4, or such units 43 may be secured to the forward face of a sheet of glass 44, as shown in Figure 5. Where the luminous units 41, 43 are of contrasting color to the glass, a certain degree of luminosity will be attained, but this may be enhanced by coating the glass intermediate said units on the side to which such units are attached with a coating 45 of opaque or semi-opaque material.

In the construction shown in Figure 9, the openings through the base member 46 may be of substantial width and a plurality of luminous strips may be inserted edgewise therein. Thus, as shown in the sectional portion of said Figure 9, inner and outer strips 47, 48 of red color may be set edgewise at the sides of the first length of the letter "W" and adjacent said strips, corresponding strips of soft material such as blotting paper 49 may be positioned, said blotting paper strips having intermediate the same a strip 51 of material of a contrasting color to the red strips, such as blue or orange. The entire character "W" may be formed of similarly assembled strips. The following letter, if desired, may be formed of a plurality of laminated red strips 52, 53, 54, cut to suitable length and interfitted with strips in adjacent slots to form the letter "E". In place of the openings being cut through the material, the material may be molded or otherwise formed. A character formed in this manner is illustrated in Figure 10, wherein a wooden cut-out letter 61 is provided having a marginal strip of light-transmitting material 62 secured to its margins throughout, and the opaque body of the structure being formed of plastic material 63 which may comprise plaster of Paris, cork composition, or a variety of materials. The character "R" shown not only has the outside of the letter provided with the outer margin 64 of luminous strips, but has an inner margin 65 of luminous strips which may surround a wooden block 66 forming the "island", or such "island" may consist of plastic composition similar to the outer portion 67 of said unit.

The units preferably are notched at the top and bottom edges to receive the upper flanges 68 of a frame member 69 having a base flange 71. The frame preferably has at intervals cross bars 72 in sufficient number to permit certain of said bars to be broken away in the event they interfere with the transmission of light to the rearward face of the luminous strips.

As has been stated above, a transparent binder may be used about the margins of the luminous strips where they intersect or engage against the base or supporting member. It is also contemplated that the character enclosing mass may itself be of a transparent or translucent or iridescent character contrasting with the color or effect of the series of characters or designs for which it forms the matrix or background.

In place of the parallel longitudinally arranged strips 52, 53, 54, shown in Figure 9, a plurality of uniformly sized strips may be arranged parallel to each other transversely of the slots, although slight irregularity at the margins is introduced in slanting or curved portions of the characters in such instances.

The device may be used in a variety of ways for both ornamental and utilitarian, and advertising purposes, and when used as a sign may form the front face 73 of a casing 74 within which is provided a lamp 75 of suitable intensity to give a high luminous effect at the forward edge 76 of the transparent units embedded in the supporting member 77.

Through the use of high intensity illumination such as is provided by photoflood lamps and the like, signs of extended size suitable for outdoor advertising and display may be provided. Through the use of colored light sources or colored screens and appropriately colored luminous strips a "flashing" effect can be obtained over certain areas of the sign through alternate dimming of one set of light sources in relation to contrasting light sources.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. A method of making a device having characters, which comprises forming a template having recesses corresponding to said characters, supporting a flat sheet-like base member on said template, cutting said base member to provide openings corresponding to said characters, and inserting flexible transparent strips edgewise in said openings in said base member with the lower portions of said strips received in the recesses of said template so as to completely fill the openings from end to end without interruption.

2. A method of making a device having characters, which comprises forming a template having recesses corresponding to said characters, supporting a flat sheet-like base member on said template, cutting said base member to provide openings corresponding to said characters, inserting flexible transparent strips edgewise in said openings in said base member with the lower portions of said strips received in the recesses of said template so as to completely fill the openings from end to end without interruption, and cementing said strips to said base member.

3. A method of making a device having characters, which comprises forming a template having continuous uninterrupted recesses corresponding to said characters, supporting a flat sheet-like base member on said template, cutting said base member to provide continuous uninterrupted openings corresponding to said characters, and inserting flexible strips of greater width than said base member in continuous succession through the openings in said base member and into the recesses of said template.

4. A method of making a device having characters, which comprises forming a template having continuous uninterrupted recesses corresponding to said characters, supporting a flat sheet-like base member on said template, cutting said base member to provide continuous uninterrupted openings corresponding to said characters, and inserting light-transmitting elements of greater thickness than the thickness of said base member through the openings in said base member and 5. A method of making a device having characters, which comprises forming a template having continuous uninterrupted recesses corresponding to said characters, supporting a flat sheet-like base member on said template, cutting said base member to provide continuous uninterrupted openings corresponding to said characters, detaching portions of said base member forming islands within the outlines of said character, inserting flexible strips of greater width than said base member in continuous succession through the openings in said base member and into the recesses of said template, and forcing the islands formed by said cutting operation against the upper surface of said template and in a position in the plane of the remainder of the base member.

6. A method of making a device having characters, which comprises forming a template having continuous uninterrupted recesses corresponding to said characters, supporting a flat sheet-like base member on said template, cutting said base member to provide continuous uninterrupted openings corresponding to said characters, detaching portions of said base member forming islands within the outlines of said character, inserting flexible strips of greater width than said base member in continuous succession through the openings in said base member and into the recesses of said template, forcing the islands formed by said cutting operation against the upper surface of said template and in a position in the plane of the remainder of the base member, and applying a securing medium between the margins of said openings and said opening filling elements.

7. The method of forming a template for use in the manufacture of signs formed from inserts of light-transmitting material in a base member, which comprises the steps of forming an opening to provide the outline of the letters or characters of such sign in a section of sheet material of a thickness equal to the extent of projection from the base for such characters on one side of said sign, and applying a backing sheet to such cut-out sheet in firmly secured relation thereto.

8. The method of forming a template for use in the manufacture of signs formed from inserts of light-transmitting material in a base member, which comprises the steps of forming an opening to provide the outline of the letters or characters of such sign in a section of sheet material of a thickness equal to the extent of projection from the base for such characters on one side of said sign, applying a backing sheet to such cut-out sheet in firmly secured relation thereto, and securing any cut-out portions of the first mentioned sheet to said backing sheet in substantially the original position of said cut-out portions.

9. A method of preparing strips from a sheet of light-transmitting material for insertion in a base member of a luminous sign having openings corresponding to characters in the form of letters, numerals and the like, which comprises the steps of simultaneously forcing lines of separation into the body of such sheet without completely severing the same, such lines of separation providing vertically positioned rows of even height throughout, each of said rows being subdivided transversely in predetermined lengths to correspond to the openings for such characters, and such lines of separation also forming short angular scorings adjacent at least one corner of each scored outline to provide a beveled end edge on each strip to permit free insertion of a separated strip in an opening in the base member.

10. A template for producing luminous devices, which comprises a sheet of material of predetermined thickness having openings cut completely therethrough along lines corresponding to predetermined characters, and a backing sheet secured to one side of said first-named sheet to provide a limit stop to members inserted edgewise through the openings in said first-named sheet.

11. A template for producing luminous devices, which comprises a sheet of material of predetermined thickness having openings cut completely therethrough along lines corresponding to predetermined characters, certain portions of said sheet being completely detached in the forming of said openings, and a backing sheet secured to one side of said first-named sheet and affording a support for the detached portions of said first-named sheet in substantially their original positions, said backing sheet providing a limit stop to members inserted edgewise through the openings in said first-named sheet.

12. A scored sheet of light-transmitting material providing units for insertion in a base member of a sign having openings corresponding to characters in the form of letters, numerals, and the like, said scored sheet comprising parallel equally spaced rows of scorings extending transversely of the sheet, other scorings at right angles to said first-named scorings and at various predetermined spaced intervals separating the first-named scorings into lengths forming the characters of the device, and short angular scorings adjacent at least one corner of each scored outline to provide a beveled end edge to permit free insertion of a separated strip in an opening in the base member.

WILLIAM J. SCHIRMER.

---

CERTIFICATE OF CORRECTION.

Patent No. 2,079,468.

May 4, 1937.

WILLIAM J. SCHIRMER.

It is hereby certified that error appears in the printed specification of the above numbered patent requiring correction as follows: Page 4, second column, line 13, claim 4, after the word "and" insert into the recesses of said template; and that the said Letters Patent should be read with this correction therein that the same may conform to the record of the case in the Patent Office.

Signed and sealed this 29th day of June, A. D. 1937.

Henry Van Arsdale

Acting Commissioner of Patents.

(Seal)

of light-transmitting material for insertion in a base member of a luminous sign having openings corresponding to characters in the form of letters, numerals and the like, which comprises the steps of simultaneously forcing lines of separation into the body of such sheet without completely severing the same, such lines of separation providing vertically positioned rows of even height throughout, each of said rows being subdivided transversely in predetermined lengths to correspond to the openings for such characters, and such lines of separation also forming short angular scorings adjacent at least one corner of each scored outline to provide a beveled end edge on each strip to permit free insertion of a separated strip in an opening in the base member.

10. A template for producing luminous devices, which comprises a sheet of material of predetermined thickness having openings cut completely therethrough along lines corresponding to predetermined characters, and a backing sheet secured to one side of said first-named sheet to provide a limit stop to members inserted edgewise through the openings in said first-named sheet.

11. A template for producing luminous devices, which comprises a sheet of material of predetermined thickness having openings cut completely therethrough along lines corresponding to predetermined characters, certain portions of said sheet being completely detached in the forming of said openings, and a backing sheet secured to one side of said first-named sheet and affording a support for the detached portions of said first-named sheet in substantially their original positions, said backing sheet providing a limit stop to members inserted edgewise through the openings in said first-named sheet.

12. A scored sheet of light-transmitting material providing units for insertion in a base member of a sign having openings corresponding to characters in the form of letters, numerals, and the like, said scored sheet comprising parallel equally spaced rows of scorings extending transversely of the sheet, other scorings at right angles to said first-named scorings and at various predetermined spaced intervals separating the first-named scorings into lengths forming the characters of the device, and short angular scorings adjacent at least one corner of each scored outline to provide a beveled end edge to permit free insertion of a separated strip in an opening in the base member.

WILLIAM J. SCHIRMER.

---

CERTIFICATE OF CORRECTION.

Patent No. 2,079,468.

May 4, 1937.

WILLIAM J. SCHIRMER.

It is hereby certified that error appears in the printed specification of the above numbered patent requiring correction as follows: Page 4, second column, line 13, claim 4, after the word "and" insert into the recesses of said template; and that the said Letters Patent should be read with this correction therein that the same may conform to the record of the case in the Patent Office.

Signed and sealed this 29th day of June, A. D. 1937.

Henry Van Arsdale

Acting Commissioner of Patents.

(Seal)

CERTIFICATE OF CORRECTION.

Patent No. 2,079,468.                                                   May 4, 1937.

WILLIAM J. SCHIRMER.

It is hereby certified that error appears in the printed specification of the above numbered patent requiring correction as follows: Page 4, second column, line 13, claim 4, after the word "and" insert into the recesses of said template; and that the said Letters Patent should be read with this correction therein that the same may conform to the record of the case in the Patent Office.

Signed and sealed this 29th day of June, A. D. 1937.

Henry Van Arsdale (Seal)                                                  Acting Commissioner of Patents.